United States Patent

Muschelknautz et al.

[11] Patent Number: 5,567,393
[45] Date of Patent: Oct. 22, 1996

[54] AGGREGATE FOR PRODUCING FRESH AIR STREAM

[75] Inventors: Claudius Muschelknautz, Lauf; Claude Bleger, Duttlenheim; Jochen Goehre, Karlsruhe, all of Germany

[73] Assignee: Robert Bosch GmbH, Stuttgart, Germany

[21] Appl. No.: 340,222

[22] Filed: Nov. 16, 1994

[30]     Foreign Application Priority Data

Jan. 26, 1994 [DE] Germany ............................ 44 02 137.2

[51] Int. Cl.$^6$ .......................... F01N 3/22; F16K 31/12
[52] U.S. Cl. .......................... 422/168; 422/172; 422/177; 60/300; 60/303; 60/307; 60/293; 137/614.2; 137/494; 137/854
[58] Field of Search ...................................... 422/168, 172, 422/177; 60/299, 300, 303, 307, 293; 137/494, 854, 614.2

[56]                References Cited

U.S. PATENT DOCUMENTS

| | | | |
|---|---|---|---|
| 3,613,646 | 10/1971 | Hisada | 123/75 CC |
| 4,359,016 | 11/1982 | Bachmann | 123/52 B |
| 5,266,753 | 11/1993 | Muschelknautz et al. | 181/224 |
| 5,286,164 | 2/1994 | Goehre et al. | 415/199.3 |
| 5,301,504 | 4/1994 | Bertling et al. | 60/307 |
| 5,377,650 | 1/1995 | Warner | 123/568 |
| 5,390,697 | 2/1995 | Muschelknautz | 137/494 |

FOREIGN PATENT DOCUMENTS 4115805  11/1992  Germany .

*Primary Examiner*—N. Bhat
*Attorney, Agent, or Firm*—Michael J. Striker

[57]                ABSTRACT

An apparatus for producing a fresh air stream, has a blower connectable at a pressure side with an exhaust gas conduit of an internal combustion engine of a motor vehicle, a fresh air supply element communicatable with the exhaust gas conduit, a check valve provided between the blower and an opening of the fresh air supply element into the exhaust gas conduit, a cut-off arranged in the fresh air supply element between the check valve and its opening into the exhaust gas conduit and having a closing member loaded with a spring force toward a closing position, an actuating member for the closing member, and a bypass branching from the fresh air supply element so that a pressure which builds when the blower operates and is supplied through the bypass to the actuating member for the closing member acts opposite to the spring force.

10 Claims, 2 Drawing Sheets

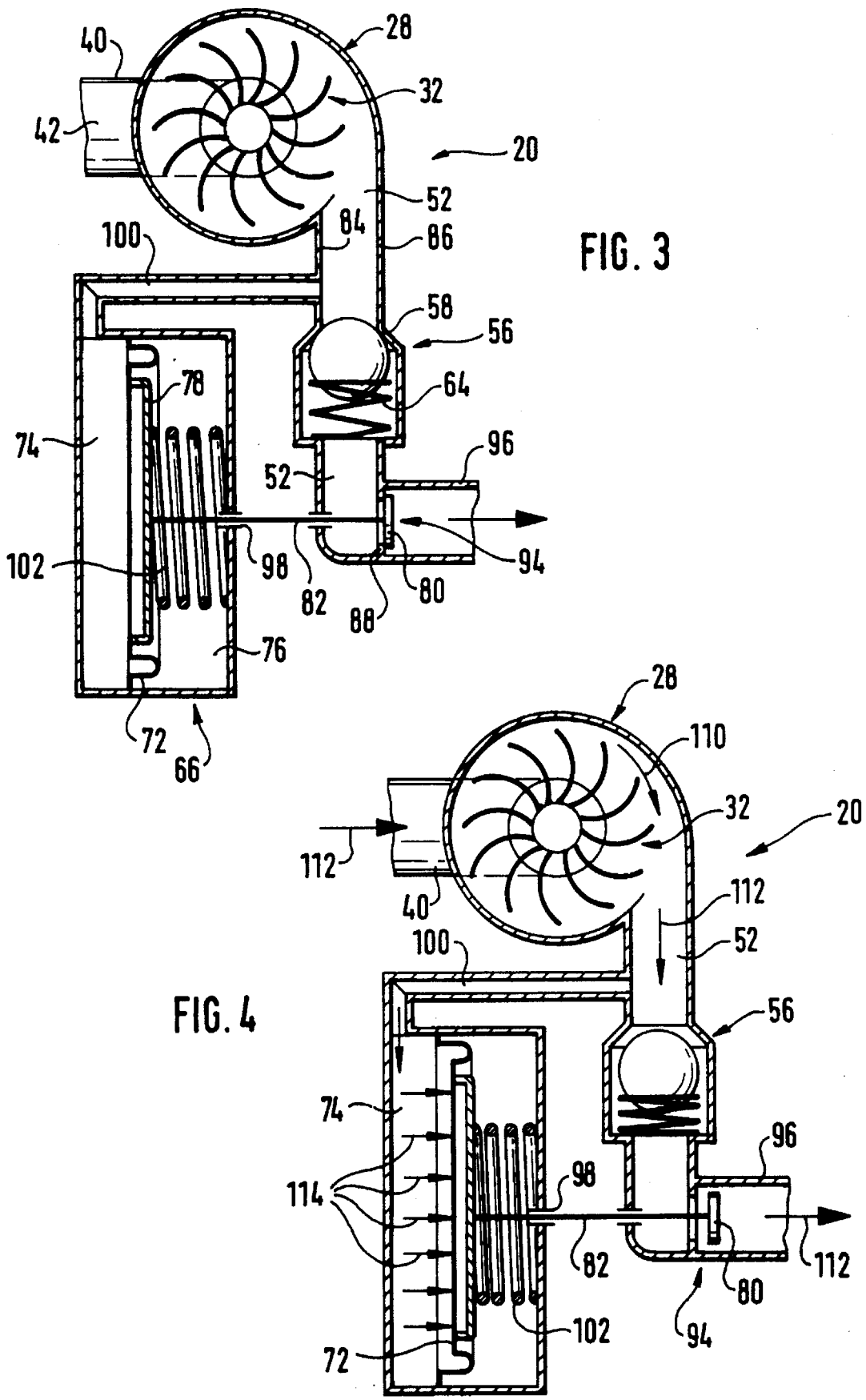

AGGREGATE FOR PRODUCING FRESH AIR STREAM

BACKGROUND OF THE INVENTION

The present invention relates to an aggregate for producing a fresh air stream.

In order to increase the action of controlled three-way catalysts it is known to use two methods, namely an exhaust gas return and a secondary air supply. These methods minimize the production of nitrogen oxides or reduce the contents of carbon monoxide and hydrocarbons before the exhaust gas reaches the catalyst. During the secondary air supply the fresh air is supplied to the exhaust gas line as short as possible behind the motor, for eliminating hydrocarbon compounds and carbon monoxide produced during the combustion process. Therefore a post-combustion of the exhaust gas is provided at temperatures of over 600° C. During this additional combustion process heat is supplied to the catalyst. This is especially important during a so-called cold start in which a relatively reach mixture is provided an automatically the CO-and HC-fractions are increased in an overproportional degree. The secondary air supply in the hot exhaust gas practically triggers a post-combustion, during which the carbon monoxide and hydrocarbons which are not burned in the motor, are post-oxidized or post-burnt. The secondary air supply however has a further effect. The controlled catalyst operates first to a predetermined operational temperature optimally. This warm-up phase can last ample time during which the motor vehicle covers several kilometers. The post-combustion by a secondary air supply system increases the exhaust gas temperatures especially in this warm-up phase. Higher temperatures provide faster response of the G-catalyst. The G-catalyst can therefore earlier perform its objective to convert the contaminants.

The present invention is a further improvement of the aggregate disclosed in the German document DE-OS 41 15 805. In this aggregate a spring loaded check valve is arranged in the fresh air supply so as to prevent a return flow of the exhaust gas into the suction region of the internal combustion engine when the pressure in the exhaust gas conduit exceeds the feeding pressure of the blower. Thereby predetermined operational conditions can be produced in the exhaust gas conduit which lead to fluttering of the check valve, so that a return flow of the exhaust gas cannot be excluded with the required reliability.

SUMMARY OF THE INVENTION

Accordingly, it is an object of the present invention to provide an aggregate of the above mentioned general type, which avoids the disadvantages of the prior art.

In keeping with these objects and with others which will become apparent hereinafter, one feature of the present invention resides, briefly stated, in an aggregate for producing a fresh air stream, in which in accordance with the present invention a cut-off valve is arranged in the fresh air supply between the check valve and its opening into the exhaust gas conduit, and the cut-off valve is provided with a closing member loaded by a force of a spring element toward a closing position, and a bypass branches from the fresh air supply and allows a pressure to be supplied to an actuating member for the closing member to act against the spring force.

When in accordance with the present invention the additional cut-off valve is controlled parallel to the check valve, the return flow of the exhaust gas into the suction region of the internal combustion engine is reliably prevented.

In accordance with another advantageous feature of the present invention, the closing member of the cut-off valve is arranged in an operative connection with a diaphragm which forms the actuating member and subdivides a control chamber into a pressure chamber and a spring chamber. The spring elements arranged in the spring chamber loads the diaphragm toward the closing direction of the working valve-closure member, while the pressure chamber is connected through the bypass with the fresh air supply.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 is a view showing schematically a blower and two valves of the aggregate in accordance with the present invention; and FIG. 4 is a view showing the arrangement of FIG. 3, wherein the blower of the inventive aggregate is activated.

DESCRIPTION OF THE PREFERRED EMBODIMENTS

Figure 1:
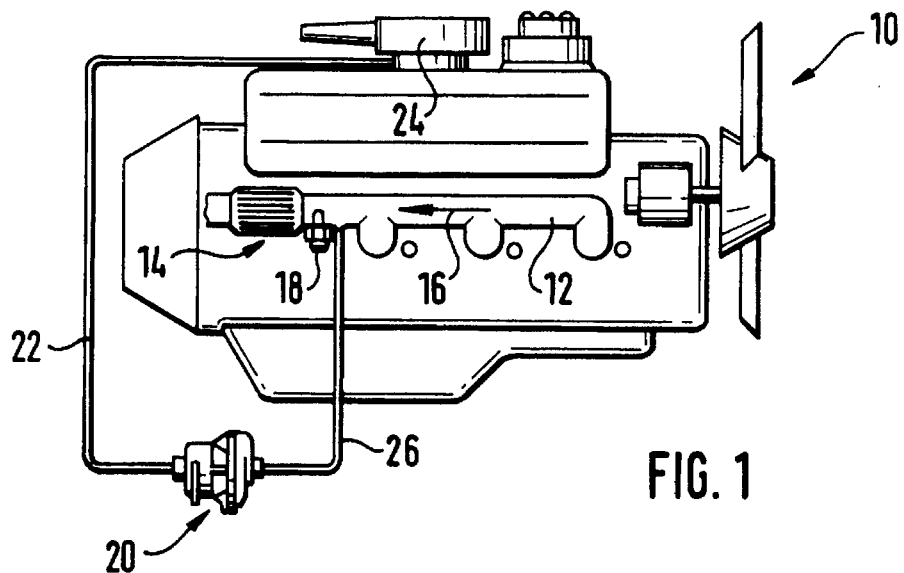
FIG. 1 is a view showing an internal combustion engine of a motor vehicle with a secondary air supply through a secondary conduit connected with an air filter and leading toward an exhaust gas line, in an aggregate for producing a secondary air stream.

An internal combustion engine of a not shown motor vehicle is identified as a whole in FIG. 1 with reference numeral 1. It has an exhaust gas line 12 in which a controlled catalyst 14 is accommodated. The exhaust gas flows in direction of the arrow 16. A so-called lambda-probe 18 is arranged in the flow direction of the exhaust gas before the catalyst 14. Further, an aggregate 20 is provided. It has a blower which through a suction conduit 22 is connected with a fresh air supply 24 for the internal combustion engine. For this purpose, the suction conduit 22 is connected with an air inlet for the internal combustion engine 10. A pressure conduit 26 extends from the aggregate 20 to the exhaust gas line 12. It opens before the catalyst 14 as considered in the flow direction identified with the arrow 16. The aggregate 20, in addition to the blower 28 shown in FIG. 2 also has an electrical, high speed, brushless drive motor 30 with a motor shaft 34 which rotates during the operation and is provided with the impeller 32 as shown in FIG. 2.

Figure 2:
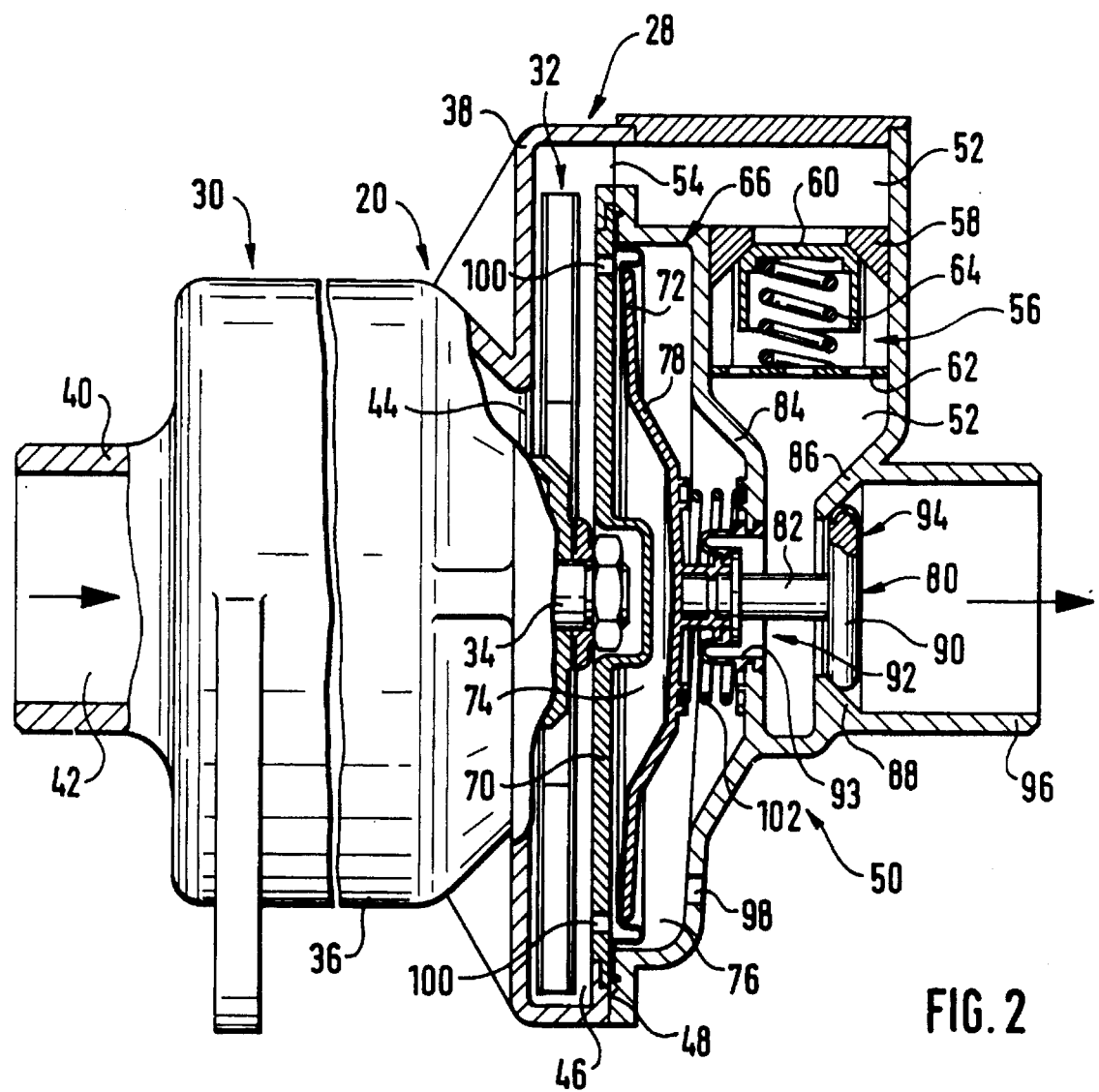
FIG. 2 is a view showing the aggregate of FIG. 1 in accordance with the present invention on an enlarged scale and partially sectioned.

The construction of the aggregate 20 is illustrated in FIG. 2. The electrical drive motor 30 of the aggregate 20 is accommodated in a motor housing 36 which merges in a substantially cup-shaped blower housing 38. The blower housing is formed as a spiral housing, and the impeller 32 is located in it. The motor housing 36 is provided at its side facing away from the blower housing 38 with a suction pipe 40 having a suction opening 42 for the blower 28. A blower chamber 46 which is formed by the blower housing 38 is connected with the interior of the motor housing 38 through a throughgoing opening 44. A roof-shaped cover part 50 is mounted on the cup edge 48 of the cup-shaped blower housing 38 and has a fresh air opening 52 communicating with the blower chamber 48 through an opening 54. A check valve 56 is arranged in the fresh air opening 52.

The check valve 56 has a valve seat 58 which is fixedly connected with the cover part and cooperates with a closing member 60. A supporting plate 62 is fixedly connected with the walls of the cover part 50, and a pre-tensioned helical pressure spring 64 abuts against the supporting plate and loads the closing member 60 toward the valve seat 58. The arrangement of the check valve 56 is selected in a known manner so that it counteracts the fresh air stream as will be illustrated hereinbelow. A control chamber 66 which is separate from the fresh air opening 52 is provided in the cover part 60. The control chamber 66 is located directly near the blower chamber 46 and separated from it by a common, plate-shaped separating element 70. The separating element 70 limits both the blower chamber 46 in an axial direction as well as the adjacent control chamber 66. The control chamber 66 is subdivided by a diaphragm 72 into two partial chambers. The arrangement of the diaphragm 72 is selected so that it forms two partial chambers, from which one partial chamber identified as a pressure chamber 74 directly adjoins the blower chamber 46. The other partial chamber 76 identified as a spring chamber is separated from the pressure chamber 74 by the diaphragm and a diaphragm plate 78 which supports the diaphragm 72. Therefore, three adjacent chambers 46, 74, 76 are located near one another in direction of the rotary axis of the motor shaft 34.

A substantially mushroom-shaped closing member 80 with a shaft 82 is anchored on the diaphragm 72 or its diaphragm plate 78. The shaft 82 extends through the intermediate walls 84 and 86 which limit the fresh air supply 52. The wall 86 is formed as a valve seat 88, and a hat portion 90 of the mushroom-shaped closing member 80 sealingly abuts against the end of the valve seat 88 which faces away from the chambers 44, 74, 76. The throughgoing opening 92 provided in the intermediate wall 84 is sealed in a known manner by a sealing member 92 from the shaft 82 so that the air located in the fresh air supply 52 cannot flow into the spring chamber 76. The closing member 80 together with the valve seat 88 form a cut-off valve 94 for opening or closing the transition of the fresh air supply 52 into a tubular pressure pipe 96 formed in the cover part 50. The cut-off valve 94 is therefore integrated in the pressure pipe or in the cover part 50.

The cover part 50 further has an aerating and deaerating opening 98 communicating with spring chambers 76 with the atmosphere. The pressure chamber 74 communicates with the blower chamber 46 through openings 100. The openings 100 form so-called bypass conduits for providing always the same pressure in the pressure chamber 74 as in the blower chamber 46. Finally, it should be mentioned that the diaphragm 72 is loaded toward the pressure chamber by a control spring 102 which is formed as a helical pressure spring and supported with pre-tensioning against the intermediate wall 84 of the cover part 50. As shown in FIG. 2 the suction pipe 40 and the pressure pipe 96 are arranged coaxially relative to one another so as to substantially simplify the mounting of the aggregate 20.

The operation of the aggregate 20 is now illustrated with reference to FIGS. 3 and 4. It should be noted that the illustration in FIG. 3 shows the operational position corresponding to the aggregate of FIG. 2. The aggregate which is in rest position is shown in FIGS. 3 and 4 without the electric drive motor 30. As can be seen from the drawings, the blower 28 has the impeller 32 accommodated in the spiral housing 28 in which the suction opening 42 opens. The spiral housing 28 merges at the pressure side into the fresh air supply 52 limited by the intermediate walls 84, 86. The check valve 56 is arranged in the fresh air supply 52 and formed as a spherical valve. The check valve is pre-tensioned by the pre-tensioned pressure spring 64 against the valve seat 58, opposite to the flow direction of the fresh air. The fresh air supply 52 merges in the region of the cut-off valve 92 into the pressure pipe 96. The openings 100 of FIG. 2 are shown here as bypass conduits 100 which open from the fresh air supply 52 into the pressure chamber 74 of the control chamber 66 which is subdivided by the diaphragm 72 into the pressure chamber 74 and the spring chamber 76. A pre-tensioned control spring 102 which is supported on a wall of the spring chamber 76 abuts against the diaphragm plate 78 and loads the diaphragm 78 toward the pressure chamber 74. The aerating and deaerating opening 94 forms simultaneously the throughgoing opening for the shaft 82 of the mushroom-shaped closing member 80 which is a part of the cut-off valve 94. The pre-tensioning force of the control spring 102 operates so that the closing member 80 orderly abuts against the valve seat 88 of the cut-off valve 94. When the electrical drive motor is activated and the impeller 32 rotates in direction of the arrow 110 in FIG. 4, the fresh air is aspirated through the suction pipe 40 which flows the electric motor 30 shown in FIG. 2 and therefore cools the thermally loaded elements. A pressure builds in the fresh air conduit 52 before the closed cut-off valve 52 of FIG. 3 as considered in the flow direction of the arrow 112. It acts through the bypass 100 also onto the side of the diaphragm 72, which faces the pressure chamber 74. This pressure is identified in FIG. 4 by several arrows 114. When this pressure which is built in the pressure air conduit 52 before the cut-off valve 56 and in the pressure chamber 74 exceeds a predetermined value, the check valve 56 opens as shown in FIG. 4 and also the cut-off valve 94 opens as well as under the action of the pressure acting in the pressure chamber 74. When the force acting on the diaphragm exceeds the pre-tensioning force of the control spring 102, it is compressed by the diaphragm 72 movable in the spring chamber and simultaneously the cut-off valve 94 opens through the shaft 82. The fresh air stream 112 can now flow without obstacles from the suction opening 42 through the electrical drive motor 30 and through the blower 28 in correspondence with the arrows 112, where it leaves at the pressure pipe 96 of the aggregate 20 and is supplied through the pressure conduit 26 to the exhaust conduit 12 of the internal combustion engine.

The arrangement of the cut-off valve in the fresh air supply provides a reliable operation of the aggregate 20. In critical operational conditions the cut-off valve 24 also prevents the undesirable fluttering of the check valve 56. The inventive construction of the aggregate 20 is selected so that a compact aggregate is formed which can be simply arranged in narrow mounting conditions in the motor chamber of the motor vehicle.

It will be understood that each of the elements described above, or two or more together, may also find a useful application in other types of constructions differing from the types described above.

While the invention has been illustrated and described as embodied in an aggregate for producing fresh air stream, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An apparatus for producing a fresh air stream, comprising a blower having an impeller and connectable at a pressure side with an exhaust gas conduit of an internal combustion engine of a motor vehicle; a fresh air supply element communicatable with the exhaust gas conduit; a check valve provided between said blower and an opening of said fresh air supply element into the exhaust gas conduit; a cut-off valve arranged in said fresh air supply element between said check valve and its opening into the exhaust gas conduit and having a closing member loaded with a spring force toward a closing position; an actuating member for said closing member; a bypass branching from said fresh air supply element so that when said blower operates a pressure builds and is supplied through said bypass branching to said actuating member for said closing member to act opposite to said spring force; an electric drive motor which has a shaft supporting said impeller; a cup-shaped blower chamber which accommodates said impeller and has walls connected with a housing part of said motor; and a roof-shaped cover part which closes said blower chamber and is provided with said check valve, said cut-off valve and a control chamber.

2. An apparatus as defined in claim 1; and further comprising a spring element which provides said spring force for loading said closing member toward said closing position.

3. An apparatus as defined in claim 2; and further comprising means forming a control chamber, said actuating member being formed as a diaphragm which is operatively connected with said closing member of said cut-off valve and subdivides said control chamber into a pressure chamber and a spring chamber, said spring element being accommodated in said spring chamber and loading said diaphragm in a closing direction of said closing member, said pressure chamber communicating with said fresh air supply element through said bypass.

4. An apparatus as defined in claim 3, wherein said bypass between said blower and said check valve is connected with said fresh air supply element.

5. An apparatus as defined in claim 3, wherein said spring chamber has an opening communicating said spring chamber with atmosphere.

6. An apparatus as defined in claim 1, wherein said walls of said blower chamber and said housing part of said motor together form a one-piece element.

7. An apparatus as defined in claim 1; and further comprising a motor housing provided with a suction opening for said blower and also provided with an opening for supplying a sucked air to said blower chamber.

8. An apparatus as defined in claim 7, wherein said suction opening is surrounded by a further pipe and arranged approximately coaxial to a pipe which is located in the flow direction of fresh air behind said cut-off valve on said cover part.

9. An apparatus as defined in claim 8, wherein said cut-off valve is integrated in said further pipe.

10. An aggregate for producing a fresh air stream, comprising a blower having an impeller and connectable at a pressure side with an exhaust gas conduit of an internal combustion engine of a motor vehicle; a fresh air supply element communicatable with the exhaust gas conduit; a check valve provided between said blower and an opening of said fresh air supply element into the exhaust gas conduit; a cut-off valve arranged in said fresh air supply element between said check valve and its opening into the exhaust gas conduit and having a closing member loaded with a spring force toward a closing position; an actuating member for said closing member; a bypass branching from said fresh air supply element so that when said blower operates a pressure builds and is supplied through said bypass branching to said actuating member for said closing member to act opposite to said spring force; an electric drive motor which has a shaft supporting said impeller; a cup-shaped blower chamber which accommodates said impeller and has walls connected with a housing part of said motor; a roof-shaped cover part which closes said blower chamber and is provided with said check valve, said cut-off valve and a control chamber; and a plate-shaped separating element which limits said bower chamber and said control chamber and is provided with at least one opening which connects said chambers with one another and forms said bypass.

* * * * *